May 2, 1967　　　　J. D. SCRUGGS　　　　3,316,587
PIPE INSULATING MACHINE
Filed Jan. 9, 1964　　　　　　　　　　　　2 Sheets-Sheet 1

INVENTOR.
JOHN D. SCRUGGS
BY
ATTORNEY

May 2, 1967

J. D. SCRUGGS 3,316,587

PIPE INSULATING MACHINE

Filed Jan. 9, 1964

INVENTOR.
JOHN D. SCRUGGS
BY
Willard S. Grout
ATTORNEY

United States Patent Office 3,316,587
Patented May 2, 1967

3,316,587
PIPE INSULATING MACHINE
John D. Scruggs, Eugene, Oreg., assignor, by direct and mesne assignments, to Ralph A. Carison, Salt Lake City, Utah
Filed Jan. 9, 1964, Ser. No. 336,691
3 Claims. (Cl. 18—5)

This invention pertains to improvements in a pipe insulating machine and is particularly directed to a machine adapted to apply material of crushed, pebble or aggregate type uniformly around pipe.

Heretofore the prefabrication pipe insulation industry depended upon preformed blocks of various materials to place around the pipe after which it was covered with plastic, metal or some other outside cover or conduit. The placement of such materials around the pipe by hand is expensive, laborious and time consuming.

One of the objects of this invention is to overcome the recited disadvantages of former practice by the mechanical application of materials consisting of crushed, pebble or aggregate type around a pipe to be insulated.

Another object is to provide a machine for placing the materials uniformly around the pipe so as to avoid joints, seams and voids in the insulation covering.

A further object is to place insulative materials, regardless of their kind, around a pipe in the required and specified thickness, compactness and lacking in voids.

It is also an object to provide a pipe insulating machine which is adapted under operator control to avoid any difference in densities, voids and the like by adding different sized materials and "fines" so as to eliminate the possibility of voids, harmful air pockets, and thick and thin places in the insulative covering.

Further features and advantages of this invention will appear from a detailed description of the drawings in which.

Figure 1:
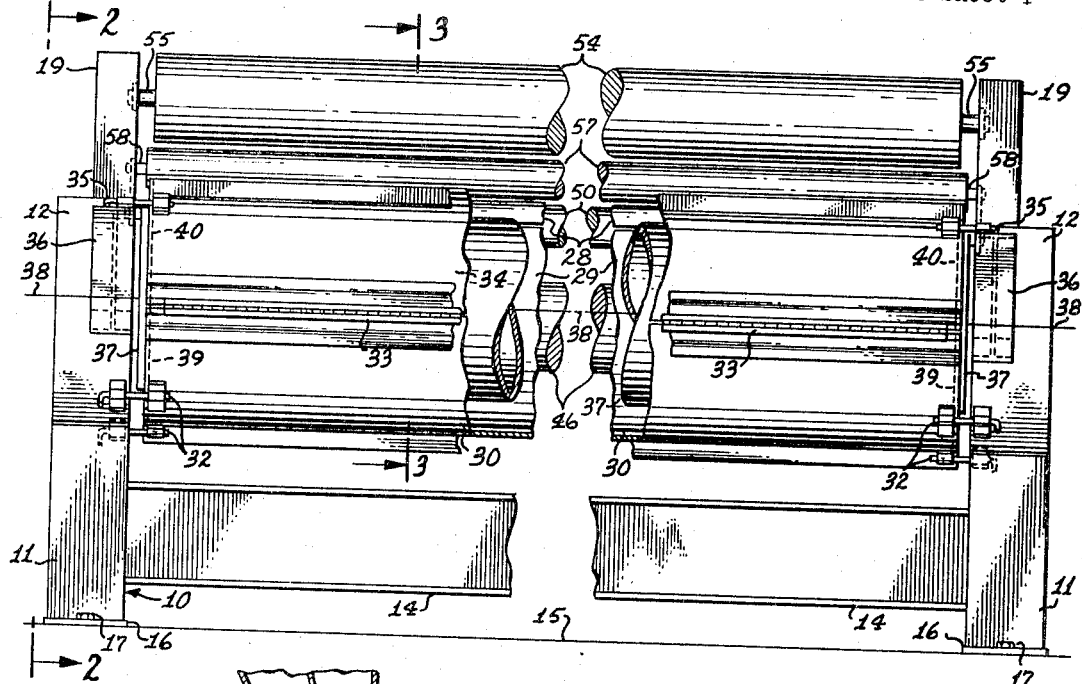
FIG. 1 is a front elevation of pipe insulating machine incorporating the features of this invention.
Figure 2:
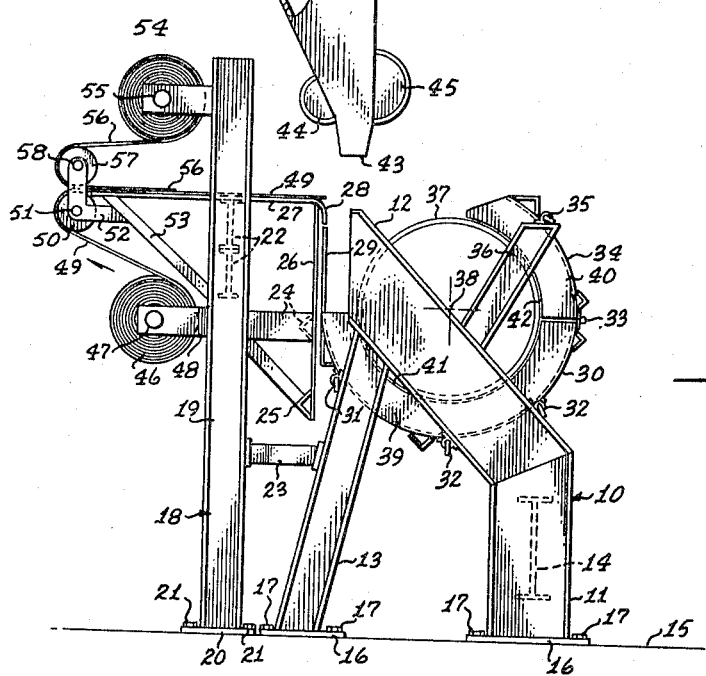
FIG. 2 is a left hand side elevation of the machine shown in FIG. 1, indicated by the line 2—2.

As an example of one embodiment of this invention there is shown a pipe insulating machine comprising a frame 10 consisting of a pair of longitudinally spaced front legs 11 the top portions 12 of which slope upwardly and rearwardly and are supported by suitable rear legs 13. A suitable tie bar 14 is interconnected between the legs 11 to give added stability to the legs 11. Both the front 11 and rear legs 13 are secured to the floor 15 by suitable floor flanges 16 and bolts 17.

To the rear of the frame 10 is the membrane or plastic sheet support stand 18 comprising a pair of upright columns 19 secured to the floor 15 by suitable floor flanges 20 and bolts 21. The upper ends of the columns 19 are tied together by suitable tie bars 22 while brackets 23 secure the columns 19 to the rear legs 13 for greater rigidity.

Fixed to the upper forward portion of the columns 19 by suitable support members 24 and 25 is the vertically disposed back-up plate 26. Extending horizontally rearwardly from the top edge of the plate 26 is the membrane guide plate 27 secured to the top of the columns 19. The front edge 28 of the guide plate 27 is turned downwardly and is aligned with compression plate 29. The compression plate 29 merges at its lower edge with the semi-cylindrical molding plate 30 secured to the rear legs 13 by suitable pull-pins 31 and to the top portions 12 of the front legs 11 by suitable pull-pins 32. Hinged at 33 to the upper front edge of the semi-cylindrical molding plate 30 is a quarter-segment molding plate 34 locked in place by suitable pull-pins 35 on the upper ends of the bracket 36 of the top portions 12 of the front legs 11.

The workpiece or length of pipe 37 to be operated upon is suitably journaled and driven to revolve about an axis 38 by any suitable chucking and driving means (not shown) carried on the top portions 12 of the front legs 11. Formed integral with the end edges of the molding plates 30 and 34 are the respective radially disposed end plates 39 and 40 having inner edges 41 and 42 of just slightly greater radius from the axis of rotation 38 of the workpiece 37 than the peripheral radius of the workpiece to be operated upon so as to confine the longitudinal extent of the insulative materials to be applied to the pipe 37.

Insulative materials are supplied to the machine from the supply hoppers 41 and 42 suitably mounted on the frame 10 which have a common discharge outlet 43 located above the membrane guide plate 27 and discharging down immediately in front of the compression plate 29. Suitable control valves 44 and 45 are provided for the respective hoppers 41 and 42, each of which may be manually operated by any conventional apparatus, not shown. Preferably, the hopper 41 may contain fine insulative materials while the hopper 42 may contain coarser materials.

A roll of plastic membrane sheet 46 is rotatably journaled on a suitable support bar 47 carried on brackets 48 attached to the columns 19. The plastic sheet 49 unwinds from the roll 46 and travels up over the idler guide roller 50 suitably journaled on a shaft 51 carried in the bracket 52 fixed to the arm 53 support the guide plate 27 and fixed to the columns 19. The plastic sheet 49 then travels forwardly horizontally on top of the guide plate 27. A further roll of plastic sheet 54 is rotatably supported on a shaft 55 suitably carried on the frame 10 and has a plastic sheet 56 which passes downwardly over the idler roller 57 journaled on a shaft 58 carried in the brackets 52. The sheet 56 passes under the roller 57 and forwardly over the top of the sheet 49.

Figure 3:
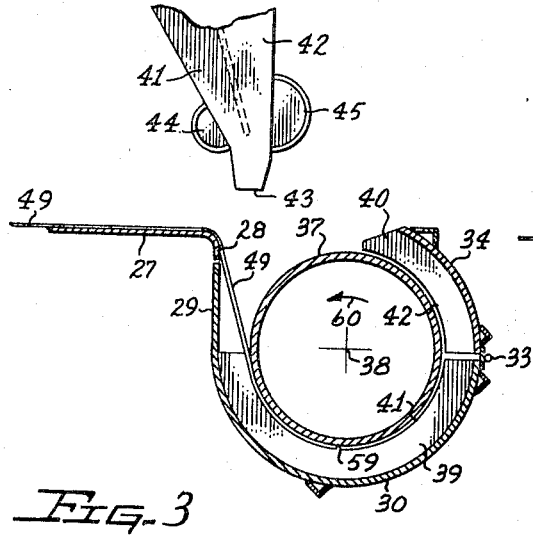
FIG. 3 is an enlarged sectional view on the line 3—3 of FIG. 1 showing the work in the machine at the beginning of the insulating operation.

In the operation of the machine, the plastic sheet 49 is brought over the guide plate 27 and the turned down front edge 28 and the edge of the sheet suitably adhesively attached to the peripheral surface of the pipe 37 to be covered at the point 59, FIG. 3. The pipe 37 is then rotated counterclockwise, FIGS. 1, 3, 4 and 5, as indicated by the arrow 60 until at least a complete wrap of the plastic sheet 49 is provided around the pipe periphery so as to bond the plastic sheet or membrane 49 on the pipe surface to provide a first and primary vapor seal and corrosive protector for the raw outside pipe surface.

Figure 4:
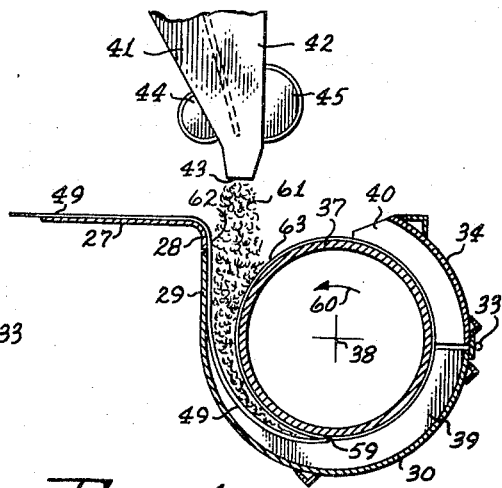
FIG. 4 is an enlarged sectional view similar to FIG. 3 but showing an intermediate stage of the machine operating cycle.

Insulative materials 61 of crushed peddle or aggregate type are then fed from the hoppers 41 and 42 by the appropriate manipulation of the control valves 44 and 45 into the space between the surface 62 of the sheet 49 as it slides down the front face of the compression plate 29, FIG. 4, and against the other surface 63 of the plastic sheet 49 as the pipe 37 is rotated in the direction of the arrow 60. This entraps the materials 61 between the plastic sheet surfaces 62 and 63, forcing the incoming sheet 49 against and in sliding contact with compression plate 29 and the molding plates 30 and 34 to form the outside diameter of the insulative covering.

Figure 5:
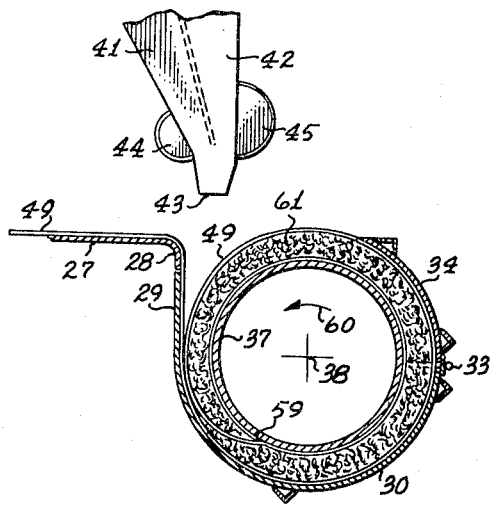
FIG. 5 is an enlarged sectional view similar to FIGS. 3 and 4 but showing the work and machine parts at the conclusion of the operating cycle.

Continued rotation of the pipe 37 in the direction indicated by the arrow 60, FIG. 5, completes the distribution of the insulative material around the pipe and the placement of the plastic sheet 49 completely around the insulative material surrounding the pipe. The protective moisture proofing and abrasion resisting sheet 56 may then be wrapped over the plastic sheet 49 to complete the pipe insulating operation.

Figure 6:
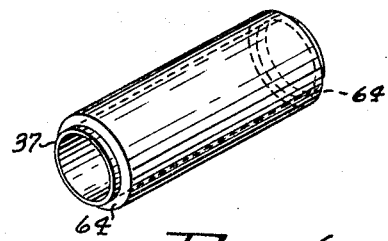
FIG. 6 is a perspective view showing the completed insulated pipe section.

The completed insulated pipe is unchucked from the holding and driving fixtures and the hinged quarter-segment molding plate 34 swung back on the hinge 33 and lifted from the machine. The exposed ends 63, FIG. 6, may then be covered with plastic material to stabilize the insulative materials for safe handling of the insulated pipe sections.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A pipe insulating machine comprising in combination:
    (a) a frame adapted to rotatably support a workpiece,
    (b) a semi-cylindrical molding plate fixed on said frame and surrounding and radially spaced from the axis of rotation of the workpiece on said frame,
    (c) a compression plate on said frame located radially to one side of said workpiece axis,
    (d) a plastic sheet feeding guide plate on said frame associated with said compression plate,
    (e) and a supply and feeding means on said frame for presenting insulative materials in the space between said compression plate and the workpiece rotatably supported on said frame.

2. A pipe insulating machine comprising in combination:
    (a) a frame including means for horizontally rotatably supporting a length of pipe to be insulated,
    (b) a semi-cylindrical molding plate fixed on said frame and surrounding the lower half and radially spaced from the axis of rotation of the pipe on said frame,
    (c) a vertically disposed compression plate fixed on said frame and located above and merging with one end of said semi-cylindrical molding plate,
    (d) a horizontally disposed guide plate fixed on said frame having a turned down front edge aligned with one end of said semi-cylindrical molding plate,
    (e) and a materials hopper fixed on said frame having a discharge outlet located above said guide plate and adapted to discharge said materials in the space between said vertically disposed compression plate and a workpiece rotatably mounted on said frame above said semi-cylindrical molding plate.

3. A pipe insulating machine comprising in combination:
    (a) a frame including means for horizontally rotatably supporting a length of pipe to be insulated,
    (b) a semi-cylindrical molding plate fixed on said frame and surrounding the lower half and radially spaced from the axis of rotation of the pipe on said frame,
    (c) a vertically disposed compression plate fixed on said frame and located above and merging with one end of said semi-cylindrical molding plate,
    (d) a horizontally disposed guide plate fixed on said frame having a turned down front edge aligned with one end of said semi-cylindrical molding plate,
    (e) a materials hopper fixed on said frame having a discharge outlet located above said guide plate and adapted to discharge said materials in the space between said vertically disposed compression plate and a workpiece rotatably mounted on said frame above said semi-cylindrical molding plate,
    (f) a supply roll of plastic sheet on said frame adapted to be fed over the top of said horizontally disposed guide plate and down over said turned down front edge when the edge of said sheet is attached to the outside pipe surface,
    (g) said discharged materials from said hopper being deposited on said plastic sheet between said sheet and the peripheral surface of said pipe as said pipe rotates in the direction of wrap-up of said plastic sheet on said pipe.

References Cited by the Examiner

UNITED STATES PATENTS

| 255,568 | 3/1882 | Bartram | 25—30 |
| 2,470,068 | 5/1949 | Contenson | 25—30 |

FOREIGN PATENTS

| 56,173 | 6/1952 | France. |
| 405,659 | 2/1934 | Great Britain. |

J. SPENCER OVERHOLSER, *Primary Examiner.*

WILBUR L. McBAY, *Assistant Examiner.*